Feb. 21, 1967 J. JONGKIND ETAL 3,305,639

ARRANGEMENT FOR SCANNING A SET OF APPARATUSES PARTITIONED INTO AT LEAST THREE SUBSETS THE APPARATUSES OF DIFFERENT SUBSETS BEING SCANNED AT DIFFERENT FREQUENCIES

Filed May 3, 1963 10 Sheets-Sheet 1

INVENTORS
JAN JONGKIND
GERRIT MOL
BY
Frank R. Trifari
AGENT

INVENTORS
JAN JONGKIND
GERRIT MOL
BY
Frank R. Jeifari
AGENT

SYMBOL FOR CIRCUIT OF FIG. 3

SYMBOL FOR CIRCUIT OF FIG. 4

INVENTORS
JAN JONGKIND
GERRIT MOL
BY Frank R. Trifari
AGENT

INVENTORS
JAN JONGKIND
GERRIT MOL
BY
Frank R. Jifani
AGENT

INVENTORS
JAN JONGKIND
GERRIT MOL
BY
Frank R. Jeifari
AGENT

INVENTORS
JAN JONGKIND
GERRIT MOL
BY Frank R. Trifari
AGENT

INVENTORS
JAN JONGKIND
GERRIT MOL
BY
Frank R. Trifari
AGENT

JAN JONGKIND INVENTORS
GERRIT MOL
BY
Frank R. Trifari
AGENT

INVENTORS
JAN JONGKIND
GERRIT MOL
BY
Frank R. Trifari
AGENT

INVENTORS
JAN JONGKIND
GERRIT MOL
BY
Frank R. Trifari
AGENT 3,305,639

ARRANGEMENT FOR SCANNING A SET OF APPARATUSES PARTITIONED INTO AT LEAST THREE SUBSETS THE APPARATUSES OF DIFFERENT SUBSETS BEING SCANNED AT DIFFERENT FREQUENCIES

Jan Jongkind and Gerrit Mol, Hilversum, Netherlands, assignors to North American Philips Company, Inc., New York, N.Y., a corporation of Delaware Filed May 3, 1963, Ser. No. 277,842
Claims priority, application Netherlands, May 8, 1962, 278,196
12 Claims. (Cl. 179—15)

The invention relates to an arrangement for scanning a set of apparatuses partitioned into at least three subsets, the apparatuses of different subsets being scanned at different frequencies. In large information processing installations, especially those for establishing connections in a telecommunication system, groups of apparatus of different nature frequently have to be examined concerning a particular feature at a given minimum frequency. When we consider an electronic telephone exchange as representative example, the above mentioned apparatuses may be: subscribers' line equipments, local connecting circuits, local dial information repeaters, incoming line repeaters, outgoing line repeaters, incoming dial information repeaters, outgoing dial information repeaters, and, as the case may be, other equipment. The nature of the said different apparatuses involves that for each type of apparatus there is a given minimum frequency at which they have to be scanned. The subscriber's line equipments for examples, have to be examined concerning the conditions "desires dial tone" and "desires no dial tone" or the conditions "subscriber's loop is open" and "subscriber's loop is closed." The exchange may have to satisfy the requirement that each subscriber's line circuit is scanned at least every 500 msec. The local connecting circuits have to be examined concerning the conditions "free" and "busy," but the requirement may have to be satisfied that each local connecting circuit is observed at least every 200 msec. The local dial information repeaters have to transfer the dialling information, for example, to a register or central control member. Consequently the frequency at which the local dialling information repeaters have to be scanned must be high enough to prevent dialling information from being lost. If the dialling information consists of dial pulses having a repetition frequency of 10 sec.$^{-1}$, each local dialling information repeater has to be scanned at least every 50 msec. The most obvious and commonly used method consists in that the apparatuses are divided into two or more groups, which need not necessarily consist of apparatuses of the same type, each group of apparatuses being scanned by means of a separate scanning arrangement. The numbers of apparatuses scanned by a single scanning arrangement and the scanning speeds of these arrangements have in this case to be chosen so that each apparatus is scanned at the minimum frequency required for the relevant apparatus, and this condition can generally be satisfied by appropriate grouping of the apparatuses. It is an object of the invention to reduce the amount of electronic components by designing the scanning arrangement so that the apparatuses connected therewith can be scanned at different frequencies. According to the invention this is achieved in that all apparatuses of each subset are scanned in succession, but the succession in which the various subsets are scanned being such that there are at least two subsets which are scanned at different frequencies.

Embodiments of the invention will now be described, by way of example, with reference to the drawings. All the embodiments relate to the case where two groups of apparatuses have to be scanned at two different frequencies, however, the fundamental theoretical foundation underlying the invention obviously are independent thereof.

Figure 1:
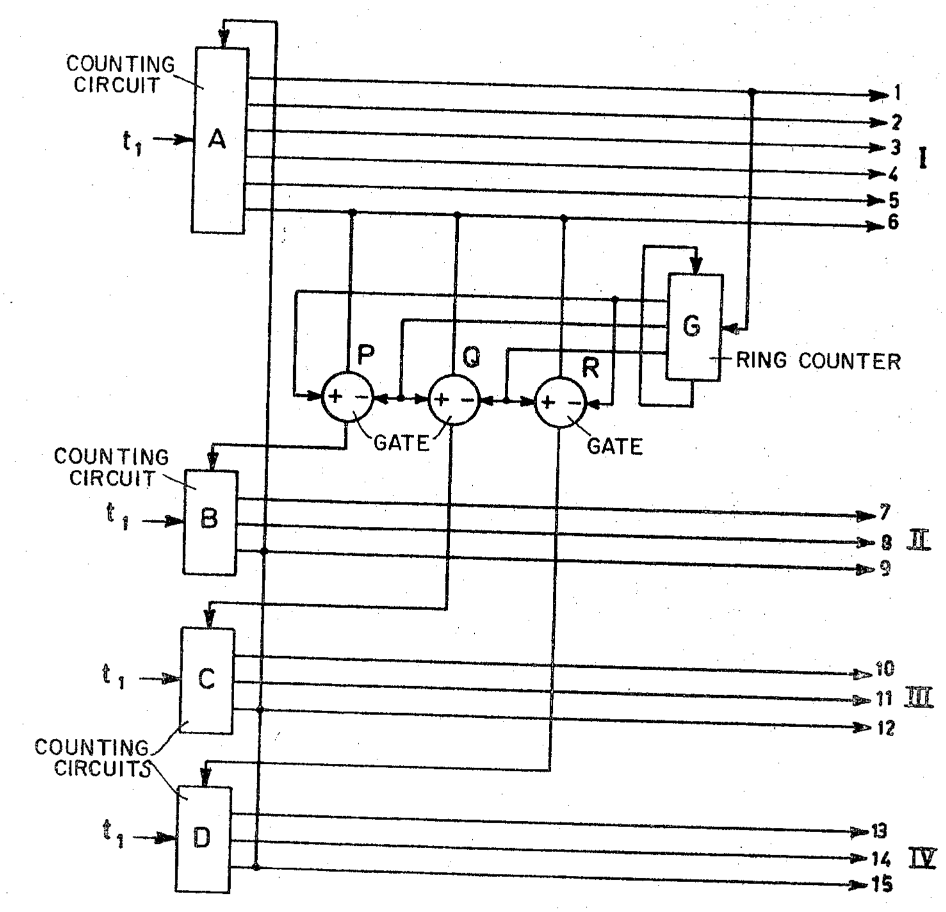
FIG. 1 shows the circuit diagram of a first embodiment of the invention.

FIG. 1 refers to the case where fifteen apparatuses have to be scanned, the first six at least every 50 msec. and the remaining nine at least every 150 msec. Obviously these numbers are arbitrarily chosen and kept comparatively small for the sake of clarity. It is assumed that scanning of an apparatus is effected by applying a current pulse to it. The wires through which the said pulses pass are designated in FIG. 1 by reference numerals 1, 2, . . . , 15. The wires receive their pulses in the manner shown from four counting circuits A, B, C and D. The set of fifteen wires 1, 2, . . . , 15 is partitioned into four subsets of wires, which are designated in FIG. 1 by the Roman numerals I, II, III and IV and comprise 6, 3, 3 and 3 wires respectively. Each of the four counting circuits A, B, C and D ensures that each time a pulse is applied in succession to each of the wires of the relevant subset. The counting circuits are controlled by clock pulses (in FIG. 1 the pulses applied at the right-hand side at the instants $t_1$ of the pulse cycles), however, each counting circuit only commences counting after having received a preparing pulse (in FIG. 1 this is the pulse which comes in at the top of the counting circuit concerned). The invention consists in that the arrangement is designed so that the counting circuits are succesively rendered operative in the sequence A, B, A, C, A, D, A, B, A, C, A, D, A, B, . . . so that a pulse is successively passed through the wires 1, 2, 3, 4, 5, 6, 7, 8, 9, 1, 2, 3, 4, 5, 6, 10, 11, 12, 1, 2, 3, 4, 5, 6, 13, 14, 15, 1, 2, 3, 4, 5, 6, 7, 8, 9, 1, 2, 3, 4, 5, 6, 10, 11, 12, 1, 2, . . . . When the time interval between each pair of successive pulses is 5 msec., a pulse is applied to each of the six wires 1, 2, 3, 4, 5, 6 every 45 msec. and to each of the nine wires, 7, 8, 9, 10, 11, 12, 13, 14, 15 every 135 msec., so that the requirements are satisfied. It will be appreciated that another grouping of the wires and another sequence of applying pulses to the various groups of wires permits the use of three or more kinds of apparatuses which are scanned at three or more different frequencies. Let it be assumed, for example, that the wires are partitioned into six equally great groups and that pulses are applied to these six groups by six counting circuits A, B, C, D, E and F. By rendering these conuters operative in the sequence

ABDACEABFACDABEACFABDACEABFA . . .

pulses are applied to the group of wires served by the counter A, to the groups of wires served by the counting circuits B and C and to the groups of wires served by the counting circuits D, E and F at three different frequencies.

Returning to the circuit shown in FIG. 1, the sequence ABACADAB . . . in which the four counting circuits A, B, C and D operate in succession is obtained with the aid of three gates P, Q and R and a ring counting circuit G having three outputs. Each of the three gates P, Q and R has two control terminals. When a pulse is applied to the first of these control terminals, which is designated by the sign +, the gate is opened. When a pulse is applied to the second control terminal, which is designated by the sign −, the gate is closed. The control terminals of the gates are connected to the output terminals of the ring counting circuit G in the manner shown in FIG. 1. The counting circuit A is activated each time the last output of one of the counting circuits B, C or D delivers a pulse. The counting circuits B, C and D are activated by a pulse delivered by the last output of the counting circuit A, this pulse being applied to the counting circuit B through the gate P, to the counting circuit C through the gate Q and to the counting circuit D through the gate R. Since, as will be shown hereinafter, each time only one of the three gates P, Q and R is open, each time only one of the three counting circuits B, C and D is activated.

The circuit operates as follows. It is assumed that the counting circuit A is activated, because the wire 15 has passed a pulse. Since the pulse concerned has been delivered by the counting circuit D, this counting circuit must have been activated before, and this is only possible if the gate R was open and the other gates were closed, that is to say, when the ring counting circuit G has delivered a pulse at its lower or third output. At the instant $t_1$ of the six next pulse cycles the six wires 1, 2, 3, 4, 5 and 6 successively pass a pulse. When the wire 1 passes a pulse, the ring counting circuit G takes one step so that its first output delivers a pulse which closes the gate R and opens the gate P. When the wire 6 passes a pulse, the counting circuit B is activated through the gate P so that at the instant $t_1$ of the three next pulse cycles, the wires 7, 8 and 9 successively pass a pulse. When the wire 9 passes a pulse, the counting circuit A is again activated, so that at the instants $t_1$ of the six next pulse cycles the wires 1, 2, 3, 4, 5 and 6 again successively pass a pulse. When the wire 1 passes a pulse, the ring counting circuit G takes another step so that its second output delivers a pulse which closes the gate P and opens the gate Q. When the wire 6 passes a pulse, the ring counting circuit C is activated through the gate Q so that at the instants $t_1$ of the three next pulse cycles the wires 10, 11 and 12 successively pass a pulse, and so on.

Figure 2:
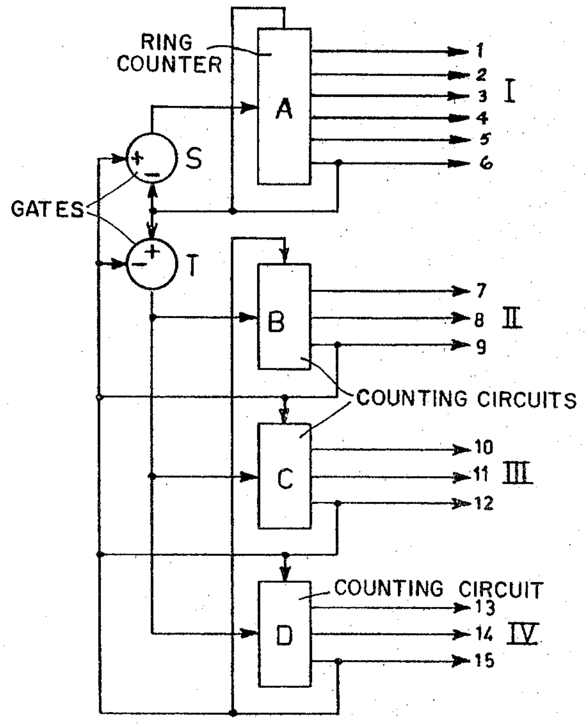
FIG. 2 shows the circuit diagram of a second embodiment of the invention.

FIG. 2 shows a slightly different solution of the same problem. This circuit comprises a ring counting circuit A, three counting circuits B, C and D forming together a ring counting circuit, and two gates S and T which, when open, apply clock pulses to the ring counting circuit A and to the ring counting circuit B+C+D respectively. For the sake of simplicity the connections of the gates S and T to the clock pulse distributor are omitted. The gate S is opened when one of the wires 9, 12 or 15 passes a pulse, and closed when the wire 6 passes a pulse. The gate T is opened when the wire 6 passes a pulse, and closed when one of the wires 9, 12 or 15 passes a pulse.

This circuit operates as follows. It is assumed that the ring counting circuit A is operative owing to the fact that the wire 15 has just passed a pulse which has opened the gate S, has closed the gate T and has set the ring counting circuit B+C+D to its first output, that is to say, the first output of the counting circuit B. At the instants $t_1$ of the six next pulse cycles the wires 1, 2, 3, 4, 5 and 6 successively pass a pulse. When the wire 6 passes a pulse, the gate S is closed, the gate T is opened and the ring counting circuit A is again set to its first output. At the instants $t_1$ of the three next pulse cycles the wires 7, 8 and 9 successively pass a pulse. When the wire 9 passes a pulse the gate T is closed, the gate S is opened and the ring counting circuit B+C+D is set to the first output of the counting circuit C. At the instants $t_1$ of the six next pulse cycles the six wires 1, 2, 3, 4, 5 and 6 again successively pass a pulse. When the wire 6 passes a pulse, the gate S is closed, the gate T is opened, and the ring counting circuit A is again set to its first output. At the instants $t_1$ of the three next pulse cycles the wires 10, 11 and 12 successively pass a pulse. When the wire 12 passes a pulse, the gate T is again closed, the gate S is opened and the ring counting circuit B+C+D is set to the first output of the counting circuit D. At the instants $t_1$ of the six next pulse cycles the six wires 1, 2, 3, 4, 5 and 6 again successively pass a pulse, and so on.

If the number of wires which according to the predetermined scheme successively have to pass a pulse is large, the counting circuits become unduly long. In this case, the circuit may be simplified by using the known circuit shown in FIG. 3. When one of the gates $x_i$ (for example, the gate $x_3$) is opened by a counting circuit X and one of the gates $y_j$ (for example, the gate $y_2$) is opened by a counting circuit Y, only one of the twelve wires (which is drawn as a heavy line in FIG. 3) can pass current. The diodes serve to prevent the formation of parallel current paths.

Figure 4:
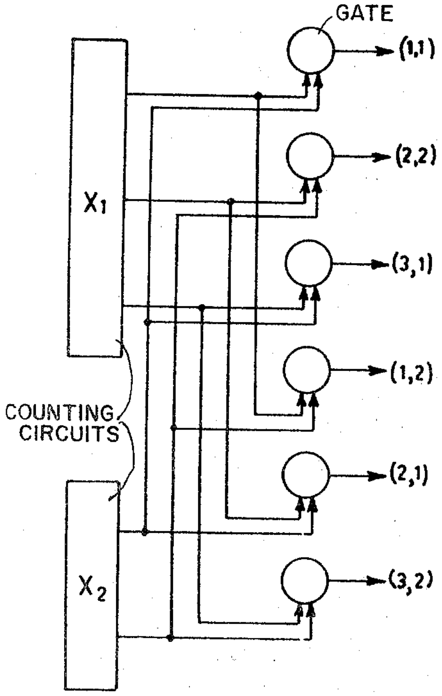
FIG. 4 shows the circuit diagram of a selecting circuit for a larger number of wires to be selected.

The circuits may be further simplified by controlling the gates at the left-hand and right-hand ends of the relevant wires in coincidence in known manner by means of two counting circuits, as is shown in FIG. 4.

Figure 3:
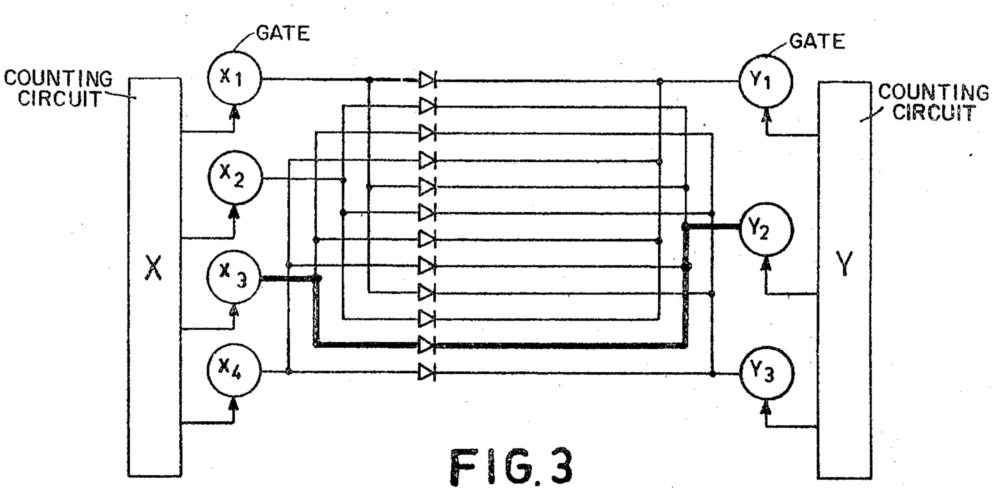
FIG. 3 shows the circuit diagram of a selecting circuit that can be used for applying the invention.
Figure 5:
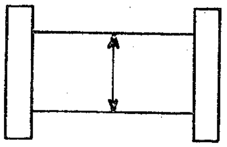
FIGS. 5 and 6 show symbols to be used for selecting circuits.
Figure 6:
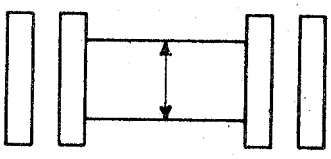

FIG. 5 shows the symbol used in circuit diagrams to represent the arrangement of FIG. 3, and FIG. 6 shows the symbol used in circuit diagrams to represent the arrangements shown in FIG. 4.

Figure 7:
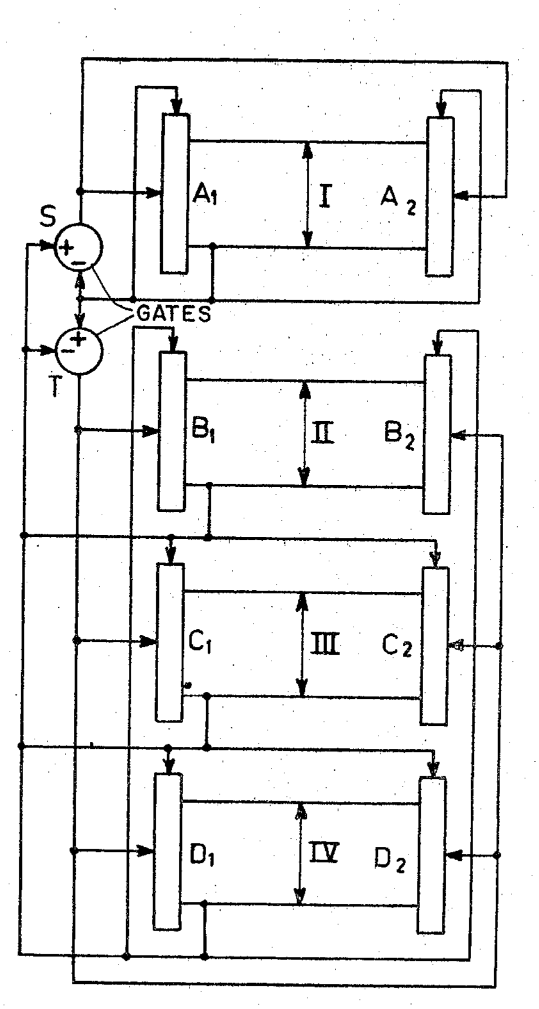
FIG. 7 shows the circuit diagram of a third embodiment of the invention.
Figure 14:
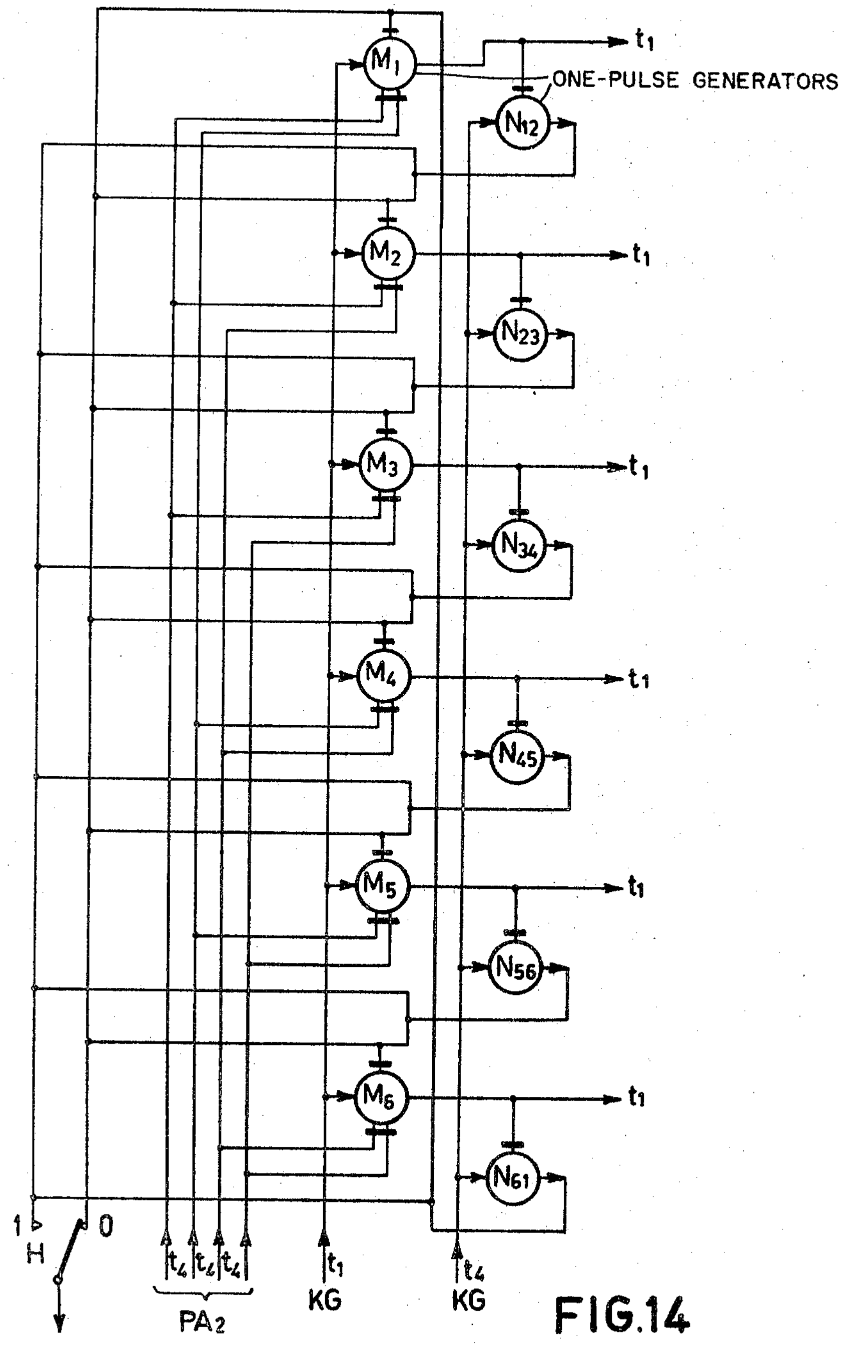
FIG. 14 shows an embodiment of a detail of the circuit of FIG. 9.

FIG. 7 shows the circuit arrangement which results from the circuit arrangement of FIG. 2 when the groups of wires are each time made to pass current in succession not by means of a single counting circuit in the manner shown in the said figure, but by means of two counting circuits in the manner shown in FIG. 3. Otherwise the circuit arrangement of FIG. 7 is substantially identical with that of FIG. 3. A difference from the circuit shown in the latter figure, however, consists in that counting circuits $A_1$, $A_2$, $B_1$, $B_2$, $C_1$, $C_2$, $D_1$, $D_2$ all are ring counting circuits and in addition are designed so that each of them idles (that is to say, does not continue counting) when the last wire of the relevant group of wires passes a pulse. Each of the said ring counting circuits starts counting again only if it is again activated and then receives clock pulses. A ring counting circuit which satisfies this condition, that is to say is made idle by the reception of a pulse, can be built according to known principles and furthermore is shown in FIG. 14.

The circuit arrangement of FIG. 7 can be materially simplified further, that is to say, can be built from a smaller number of electronic components, by causing two or four counting circuits to apply pulses to all the wires in succession according to a prescribed pattern. It is true that this renders the control of the counting circuit more complex, however, this disadvantage may be obviated by employing another method of control which at first sight may appear more complicated but has the advantage of enabling a number of further facilities to be provided in a very simple manner. As an example which shows that a considerable saving in electronic components is actually obtainable in this manner, it is assumed that the four groups of wires each comprise 100 wires. If the system of FIG. 1 were used, a circuit arrangement would include four counting circuits each having 100 counting stages (altogether 400 counting stages). If the system of FIG. 7 were used, the circuit arrangement would include eight counting circuits each having at least 10 counting stages (altogether 80 counting stages). If the 400 wires were controlled by two counting circuits, each having at least 20 counting stages (altogether 40 counting stages) would be required. In addition, at the left-hand and right-hand ends of the wires the control shown in FIG. 4 may be used and in this case the circuit arrangement includes two counting circuits each having 5 counting stages and two counting circuits each having 4 counting stages (altogether 18 counting stages). It will be seen that in the manner described a very large saving in electronic components is obtainable, which is only offset by a small additional complication of the control.

Figure 8:
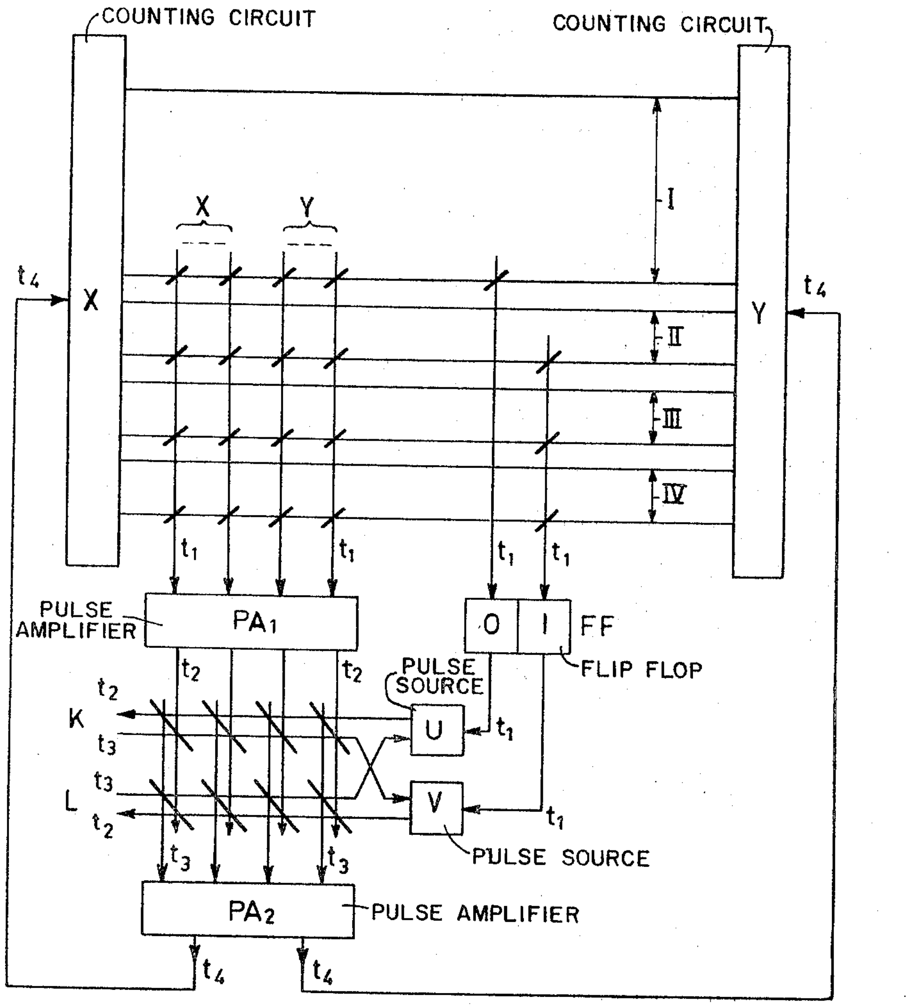
FIG. 8 shows the circuit diagram of a fourth embodiment of the invention.

FIG. 8 shows a possibility of putting the above into practice. In this figure I, II III and IV are four groups of wires which have to be made to pass a pulse in the sequence I, II, I, II, I, IV, I, II, . . . by a suitable control of the counting circuits X and Y. For the sake of simplicity it has been assumed that the control system of FIG. 3 is used. It will, however, be appreciated that the same principle of control may be employed when the system of FIG. 4 is used. The counting circuits X and Y are designed so as to idle whenever the last wire of one of the four groups of wires I, II, III or IV passes a pulse. Each wire can be determined by an address ($x_i$, $y_j$) of two coordinates which indicate the outputs of the counting circuits X and Y which have to deliver a pulse to open the relevant gates $x_i$ and $y_j$. The circuit arrangement further comprises two rows of storage cores K and L each of which can be written in parallel in coincidence by a combination of two half write pulses delivered by a pulse amplifier of a row of pulse amplifiers $PA_1$ and a half write pulse delivered by a special pulse source U (for the row K) or by a special pulse source V (for the row L). Each of the said rows of storage cores may also be read in parallel by a full read pulse delivered by the pulse source V (for the row K) or by the pulse source U (for the row L). The pulse sources U and V are controlled by a flip-flop FF. The pulse amplifiers of the row $PA_1$ receive pulses from wires which are threaded through storage cores through which the last wire of one of the four groups of wires is also threaded each time. The flip-flop FF is controlled by pulses in two wires, the first of these wires being threaded through a magnetic core through which is also threaded the last wire of the group I, and the second of these wires being threaded through three magnetic cores through which the last wires of the groups II, III or IV are threaded respectively. The pulse combinations produced by reading the row K or L are amplified in a second row of pulse amplifiers $PA_2$ and applied to the counting circuits X and Y which as a result each time deliver a pulse at the desired output. As will be described hereinafter, this is particularly simple if the coordinates $x$ and $y$ are both coded in a 2-out-of-$n$ code. The above mentioned magnetic cores through which the last wires of the groups I, II, III or IV respectively are threaded may be storage cores but need not be so, since they only have to induce a pulse in the wire leading to a pulse amplifier of the row $PA_1$ or to the flip-flop FF. Hence these cores perform the function of transformers.

The circuit arrangement shown in FIG. 8 operates as follows. It is assumed that all the wires of the group I successively pass a pulse. When the last wire of this group passes a pulse, the counting circuits X and Y are idle owing to their special construction, the values of the coordinates of the first wire of the group I are transmitted in the form of two pulse code groups of a suitable code to the row of pulse amplifiers $PA_1$ and a pulse is applied to the flip-flop FF by which this flip-flop is set to the state 0. As a result the pulse source U receives a pulse and consequently is rendered operative. It is assumed that all this takes place at the instant $t_1$ of a pulse cycle. At the instant $t_2$ of this pulse cycle the pulse amplifiers of the row $PA_1$ transmit the received pulse code groups in the form of a combination of half write pulses, and the pulse source U also delivers a half write pulse. Consequently the coordinates $x$ and $y$ of the first wire of group I are written in the row K. At the instant $t_3$ of the said pulse cycle the pulse source U delivers a whole read pulse for the row L, in which the coordinates $x$ and $y$ of the first wire of one of the groups II, III or IV, for example of the group III, have previously been written. By reading the row L the code groups corresponding to the said coordinates are transmitted in the form of pulse combinations to the row of pulse amplifiers $PA_2$. At the instant $t_4$ of the said pulse cycle this row of pulse amplifiers transfers the pulse combination corresponding to the coordinate $x$ to the counting circuit X and the pulse combination corresponding to the coordinate $y$ to the counting circuit Y. As a result, at the instant $t_1$ of the next pulse cycle the first wire of the group III passes a pulse and at the instant $t_1$ of the succeeding pulse cycles all the other wires of this group successively pass a pulse. As soon as the last wire of the group III passes a pulse, the counting circuits X and Y are idle again, the pulse amplifiers of the row $PA_1$ receive pulse combinations which correspond to the coordinates of the first wire of the group IV and the flip-flop FF receives a pulse which sets it to the state 1. Consequently this flip-flop delivers a pulse to the pulse source V which is rendered operative thereby. At the instant $t_2$ of the relevant pulse cycle the pulse amplifiers of the row $PA_1$ transmit the received pulse combinations in the form of combinations of half write pulses and the pulse source V also delivers a half write pulse, so that the coordinates of the first wire of the group IV are written in the row L. At the instant $t_3$ of said pulse cycle the pulse source V delivers a full read pulse for the row K, in which the coordinates of the first wire of the group I have previously been written. The pulse combinations corresponding to these coordinates are now transmitted to the row of pulse amplifiers $PA_2$, which at the instant $t_4$ of the said pulse cycle transmits the pulse combination corresponding to the relevant coordinate $x$ to the counting circuit X and the pulse combination corresponding to the relevant coordinate $y$ to the counting circuit Y. As a result all the wires of the group I again successively pass a pulse, and so on.

Figure 9:
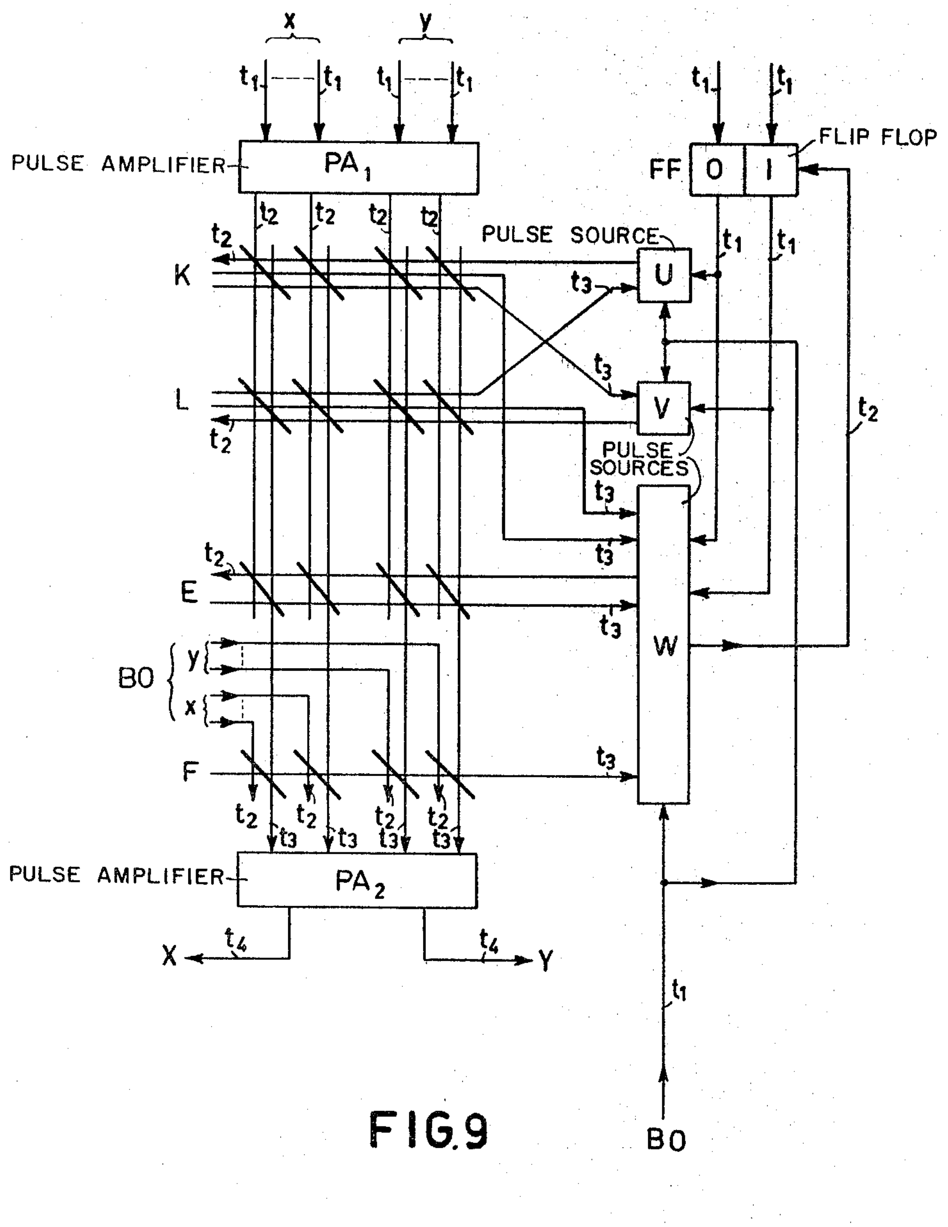
FIG. 9 shows the circuit diagram of a detail of a fifth embodiment of the invention.

FIG. 9 shows the control part of a circuit arrangement which is similar to that shown in FIG. 8 but which is provided with the additional facility of interrupting the scanning process after having scanned any apparatus, in order to scan a prescribed apparatus, after which the normal scanning process is resumed where it has been interrupted. This circuit arrangement differs from the circuit arrangement shown in FIG. 8 in that there are provided a third pulse source W and two additional rows of storage cores E and F.

The normal scanning process takes place in a manner similar to that used in the circuit arrangement shown in FIG. 8, except that the row of pulse amplifiers $PA_1$ receives two code groups corresponding to coordinates $x$ and $y$ not only when the last wire of one of the groups I, II, III or IV passes current but when every wire of these groups passes current. Hence each wire of each group is threaded through several magnetic cores. For each wire which is not the last wire of a group the said coordinates are the coordinates of the next wire of the same group. During the normal scanning process the half write pulses delivered by the row of pulse amplifiers $PA_1$ do not cause an address to be written in one of the rows K, L, E or F, because at this instant none of the pulse sources U, V or W is operative and hence the other writing coincident is lacking.

Figure 10:
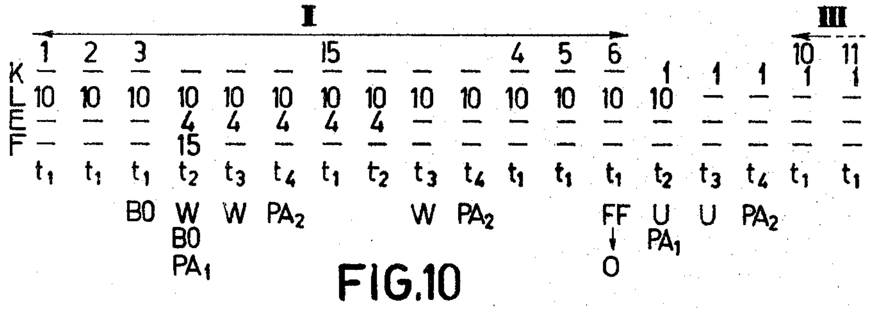
FIGS. 10, 11, 12 and 13 show time sequence diagrams illustrating the operation of the circuit shown in FIG. 9.

The operation of the circuit arrangement shown in FIG. 9 is best explained with reference to the time sequence diagrams of FIGS. 10 to 13. FIG. 10 applies to the case where after current has passed through the wire 3 of the group I the normal scanning process is interrupted in order to pass current through the wire 15 of the group IV. At the instant $t_1$ at which the wire 3 passes current, the pulse sources U, V and W each receive a pulse from a control member BO of the system. This pulse renders the pulse sources U and V insensitive up to the instant $t_4$ of the next pulse cycle, whereas the pulse source W is activated. The latter pulse source responds by delivering the following pulses:

at $t_2$: (a) a pulse to the flip-flop FF by which the latter is rendered insensitive up to the instant $t_4$ of the next pulse cycle.
(b) a half write pulse to the row E.
at $t_3$: a whole read pulse to the row F.
at $t_3$ of the next pulse cycle: a whole read pulse to the row E.

At the instant $t_2$ of the first pulse cycle the control device BO delivers two pulse code groups which represent the coordinates $x$ and $y$ of the wire 15. As will be seen from FIG. 10 the following series of operations now takes place:

at $t_1$: the wire 3 passes current; the pulse amplifiers $PA_1$ receive pulse code groups corresponding to coordinates of the wire 4; the control device BO delivers a pulse which renders U and V insensitive and W operative.
at $t_2$: the control device BO delivers pulse code groups by which the coordinates of the wire 15 are written in the row F; the pulse amplifiers $PA_1$ deliver half write pulses and W delivers a half write pulse so that the coordinates of the wire 4 are written in the row E; W delivers a pulse which renders the flip-flop FF insensitive.
at $t_3$: W delivers a whole write pulse to the row F; the pulse amplifiers $PA_2$ receive pulse code groups corresponding to the coordinates of the wire 15.
at $t_4$: the pulse amplifiers $PA_2$ transmit the received code groups to X and Y.
at $t_1$: the wire 15 passes current; the flip-flop FF receives a pulse which tends to drive it to the state 1 but this pulse has no effect since this flip-flop is still insensitive; the pulse amplifiers $PA_1$ receive pulse code groups corresponding to the coordinates of the wire 7.
at $t_2$: the pulse amplifiers $PA_1$ deliver half write pulses which have no effect, since there is no second half write pulse.
at $t_3$: W delivers whole read pulse to the row E; the pulse amplifiers $PA_2$ receive pulse code groups corresponding to coordinates of the wire 4.
at $t_4$: the pulse amplifiers $PA_2$ transmit the received code groups to counting circuits X and Y; U, V and FF are rendered sensitive again.
at $t_1$: the wire 4 passes current; the pulse amplifiers $PA_1$ receive pulse code groups corresponding to coordinates of the wire 5.

The fact that the pulse driving to the state 1 which is applied to the flip-flop at the instant $t_1$ of the second pulse cycle has no effect is not due to the accidental fact that the flip-flop is already in the state 1 but to the fact that the flip-flop still is insensitive.

FIG. 10 also shows how after the wire 6, the last wire of group I, has passed current, the circuit arrangement passes current through the wire 10, the first wire of group III. This is due to the fact that during the period in which the wire 6 passes current the flip-flop FF, which now is sensitive passes from the state 1 to the state 0 and hence delivers a pulse which renders the pulse source U operative. Hence this pulse source delivers a half write pulse to the row K at the instant $t_2$ and a whole read pulse to the row L at the instant $t_3$.

Figure 11:
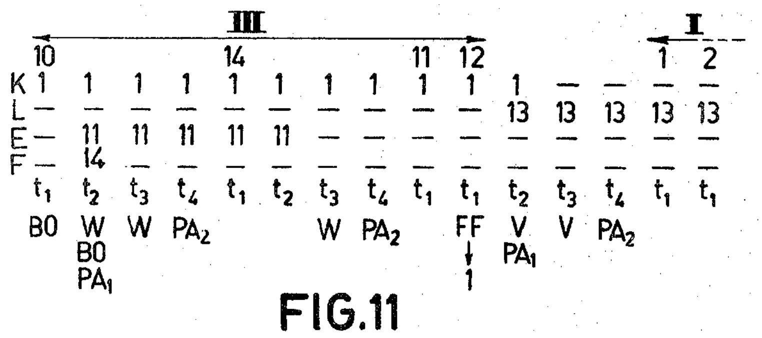

FIG. 11 is a similar time sequence diagram for the case where the normal scanning process is interrupted in the middle of the group III, and also indicates how after the wire 12, the last wire of the group III has passed current, the circuit arrangement passes current through the wire 1, the first wire of the group I.

Figure 12:
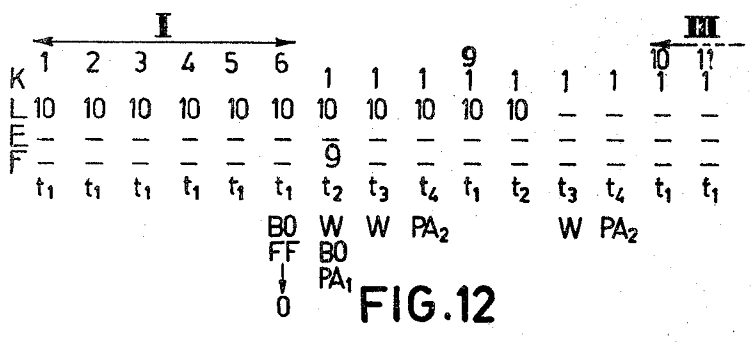
Figure 13:
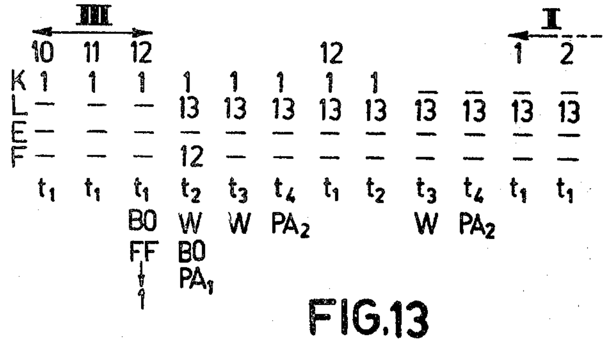

FIGS. 12 and 13 show similar time sequence diagrams for the cases where the normal scanning process is interrupted after the last wire of the group I and the last wire of the group III respectively have passed current. In these cases the pulse source W responds in manners which are slightly different from the above described cases and from one another. For this purpose the pulse source W receives the pulses delivered by the flip-flop FF to the pulse sources U and V. From FIGS. 12 and 13 it will be seen how the pulse source W has to respond in these two cases by delivering:

A: on reception of an activating pulse from the control device BO together with a pulse delivered by the flip-flop FF owing to the fact that it passes to the state 0:
at $t_2$: (a) a pulse to the flip-flop FF which renders it insensitive up to the instant $t_4$ of the next pulse cycle.
(b) a half write pulse to the row K.
at $t_3$: a whole read pulse to the row F.
at $t_3$ of the next pulse cycle: a whole read pulse to the row L.

B: on reception of an activating pulse from the control device BO together with a pulse produced by the flip-flop FF owing to the fact that it passes to the state 1:
at $t_2$: (a) a pulse to the flip-flop FF which renders it insensitive up to the instant $t_4$ of the next pulse cycle.
(b) a half write pulse to the row L.
at $t_3$: a whole read pulse to the row F.
at $t_3$ of the next pulse cycle: a whole read pulse to the row K.

FIG. 14 shows a possible embodiment of the counting circuit X, which for the sake of clarity is assumed to have only six counting stages, but this obviously has nothing to do with the principle underlying the invention. Counting circuits of this kind substantially consist of twelve storing one-pulse generators of the type described in German patent specification No. 1,093,411, FIG. 7. Of these twelve one-pulse generators the one-pulse generators $M_1, M_2, \ldots, M_6$ are to be regarded as main one-pulse generators and the one-pulse generators $N_{12}, N_{23}, \ldots, N_{61}$ as auxiliary one-pulse generators. The counting circuit further contains a preferably electronic change-over switch H, which in the normal scanning process is in the position shown in the figure and denoted by the reference numeral 0. In this case the counting circuit operates as follows. It is assumed that the one-pulse generator M, has been set but that all the other one-pulse generators have not been set. At the instant $t_1$ of the next pulse cycle all the one-pulse generators $M_i$ are triggered, but only the one-pulse generator $M_1$ delivers a pulse. This pulse is used to set the one-pulse generator $N_{12}$ and also serves as output pulse. At the next instant $t_4$ all the one-pulse generators $N_{kl}$ are triggered, but only the one-pulse generator $N_{12}$ delivers a pulse. This pulse is used to set the one-pulse generator $M_2$. At the next instant $t_1$ all the one-pulse generators $M_i$ are again triggered but now only $M_2$ delivers a pulse, which is used to set the one-pulse generator $N_{23}$ and also serves as output pulse, and so on. If, however, at an instant at which, for example, the one-pulse generator $N_{45}$ is in the set state, the change-over switch is changed over from the position 0 to the position 1, the triggering of all the one-pulse generators $N_{ij}$ results in that the one-pulse generator $N_{45}$ delivers a pulse, but this pulse can no longer set the one-pulse generator $M_5$ and hence is lost. Thus the counting circuit has idled. The counting circuit may, however, be set to an arbitrary output, that is to say, to any main one-pulse generator $M_i$, by a pulse code group delivered by the row of pulse amplifiers $PA_2$. In FIG. 14 it is assumed that the following two-out-of-four-code is used

| | |
|---|---|
| (1100)=1 | (0110)=4 |
| (1010)=2 | (0101)=5 |
| (1001)=3 | (0011)=6 |

Figure 15:
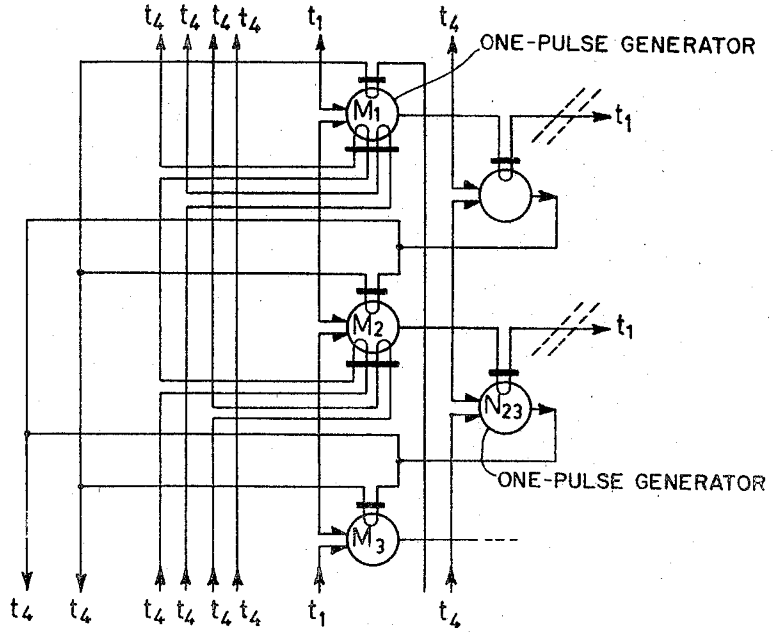
FIG. 15 shows, in a slightly more elaborate form, a detail of the circuit shown in FIG. 14.

If, for example, the row of pulse amplifiers $PA_2$ delivers the pulse code group (0110), the one-pulse generator $M_4$ is brought to the set state by coincidence but all the other one-pulse generators $M_i$ and $N_{ij}$ remain in the non-set state. At the next instant $t_1$ the fourth output of the counter delivers an output pulse. The change-over switch H is changed over either by a pulse delivered by the control device BO (when the normal scanning process is interrupted) or by the fact that the last wire of one of the groups I, II, III or IV has passed a pulse. It should be noted that in FIG. 14 for the sake of simplicity the circuit arrangement is shown as a parallel circuit instead of as a series circuit. That this provides a material simplification of the drawing will be seen from FIG. 15 in which the upper part of FIG. 14 is shown including all the required series connections.

The above mentioned apparatuses may be of widely divergent characters. A highly important case is that in which the apparatuses are groups of storage cores which have to be read periodically. The above mentioned wires may in this case be threaded through the said storage cores. If this is effected in the manner shown in FIG. 16 (see also FIG. 3), three groups of apparatuses A, B and C are formed which have to be scanned at three different frequencies. If the complete scanning period is defined as the time interval during which each of the twelve wires passes at least one pulse, each of the twelve apparatuses of the group A is scanned once, each of the four apparatuses of the group B three times and each of the three apparatuses of the group C four times during a complete scanning period. Hence the frequencies with which the apparatuses of the groups A, B and C are scanned are in the ratio 1:3:4.

Figure 17:
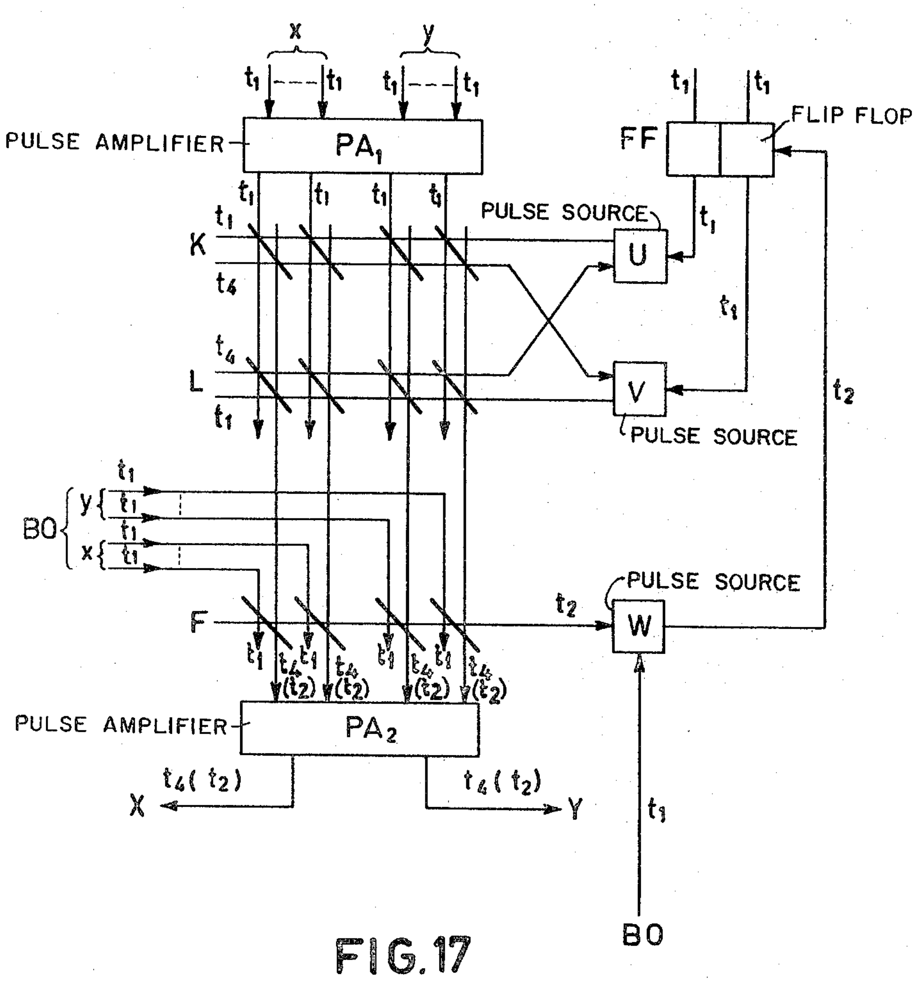
FIGS. 17 and 18 show details of a modified embodiment of the circuit shown in FIG. 9.
Figure 18:
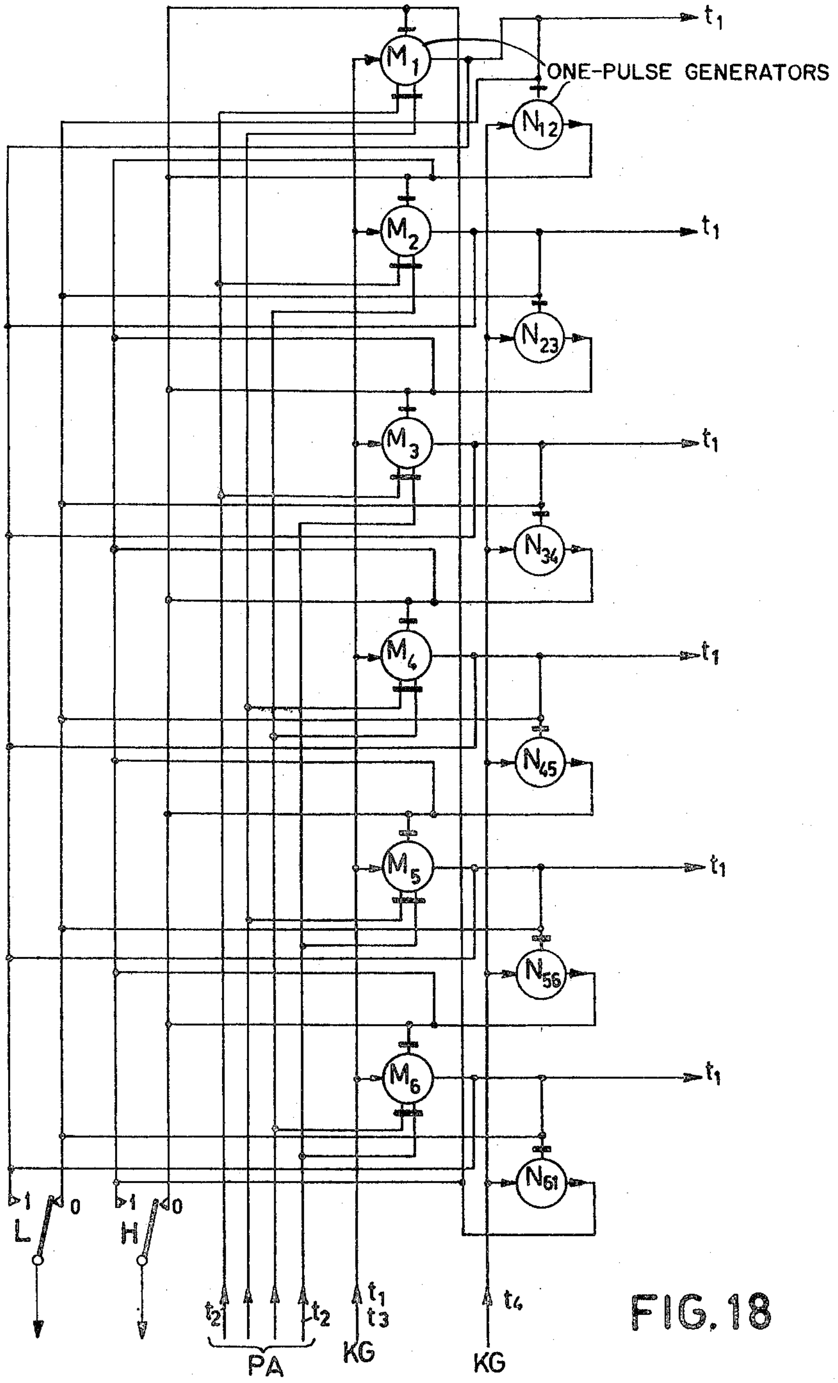

Furthermore various modifications may be provided in the circuit arrangements given by way of example. One of these modifications consists in that the intermediate scanning of an apparatus designated by the control device BO may be performed at another instant of the pulse cycles than that at which normal scanning takes place, so that the normal scanning process is not delayed by the intermediate scanning of an apparatus designated by the control device. FIGS. 17 and 18 show how the circuit arrangements shown in FIGS. 9 and 14 have to be altered if the intermediate scanning is effected at the instant $t_3$ of a pulse cycle.

The circuit arrangement shown in FIG. 17 differs from that shown in FIG. 9 in respect of the following points:

(1) The rows of pulse amplifiers $PA_1$ and $PA_2$ have no delay function but immediately transmit a received pulse combination.

(2) The pulse sources U and V are not made insensitive by the control device BO when an apparatus is scanned between two normally scanned apparatuses.

(3) The row of storage cores E has no function and hence is omitted.

(4) Only at the instant $t_2$ of the pulse cycle at which the pulse source W is rendered operative by the control device BO this source delivers a whole read pulse to the row F.

The circuit arrangement shown in FIG. 18 differs from that in FIG. 14 in respect of the following points:

(1) The one-pulse generators $M_i$ are triggered not only at the instant $t_1$ but also at the instant $t_3$ of each pulse cycle.

(2) A second change-over switch J is provided, which normally is in the position shown in the figure and designated by the reference numeral 0, but which, at the instant $t_2$ of the pulse cycle in which intermediate scanning takes place, is set to the position 1 by the control device and at the instant $t_4$ of the same pulse cycle is re-set to the position 0 by the control device. In the position 0 the pulse delivered by a one-pulse generator $M_i$ is used to set the one-pulse generator $N_{i,i+1}$, but in the position 1 the delivery of a pulse by a one-pulse generator $M_i$ does not result in setting of the one-pulse generator $N_{i,i+1}$.

If at the instant $t_1$ of a pulse cycle at which the one-pulse generator $M_3$ delivers a pulse, the command is received to scan an apparatus which corresponds to the one-pulse generator $M_6$ the following series of operations take place:

$t_2$: $M_3$ delivers an output pulse; $N_{34}$ is set; an apparatus corresponding to $M_3$ is scanned; the address of an apparatus corresponding to $M_6$ is written in the row F; W is rendered operative.

$t_2$: W delivers a whole read pulse to the line F; $M_6$ is set by pulses from $PA_1$; FF is rendered insensitive by W; the change-over switch J is set to the position 1.

$t_3$: $M_6$ delivers an output pulse but this does not result in $N_{61}$ being set; the apparatus corresponding to $M_6$ is scanned out of turn.

$t_4$: $N_{34}$ delivers a pulse; $M_4$ is set; FF is rendered responsive again; the change-over switch J is restored to the position 0.

$t_1$: $M_4$ delivers an output pulse; $N_{45}$ is set; an apparatus corresponding to $M_4$ is scanned.

In this time sequence diagram it is assumed that the apparatus which is scanned according to the normal scanning cycle is not the last apparatus of a group, because in this event one of the two pulse sources U or V is rendered operative by the flip-flop FF. The relevant time sequence diagram may, however, readily be deduced.

The above also clearly shows that the pulse sources U, V and W are counters which, when they have been rendered operative have to deliver output pulses in a predetermined sequence and at predetermined instants of the pulse cycles. Consequently they may be of the type shown in FIG. 14 or 18 or even considerably simpler.

Figure 16:
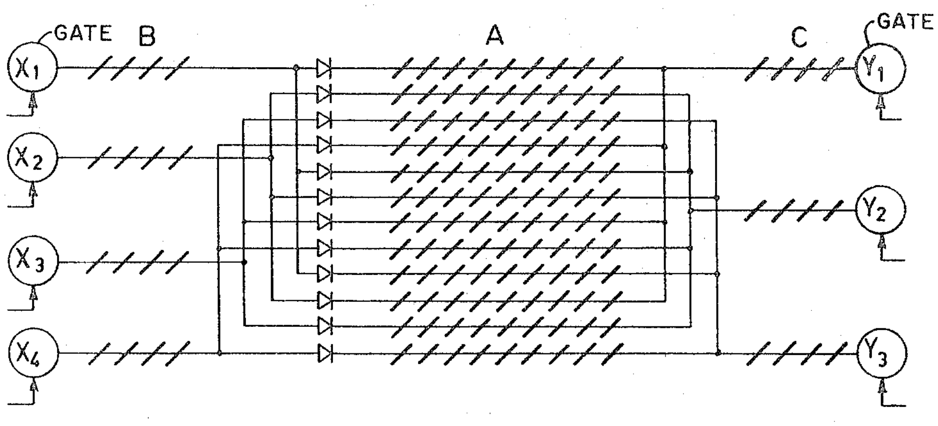
FIG. 16 shows an alternative possibility of obtaining at least two scanning freqeuncies.

Finally it should be noted that, when a circuit arrangement is used of the type indicated by the symbol of FIG. 5 or FIG. 6, the magnetic cores which indicate the address of a succeeding apparatus may be threaded on the wires which are immediately connected to the output terminals of the gates $x_i$ and $y_i$, that is to say, at the points at which the memory cores of the apparatuses of the groups B and C are disposed in the circuit arrangement shown in FIG. 16. This is shown by broken lines in FIG. 15.

Obviously in the circuit arrangements shown in FIGS. 8, 9 and 17 the flip-flop FF may be dispensed with and the rows of pulse amplifiers $PA_1$ and $PA_2$ may be replaced by logical members (essentially translators), the first logical member determining the row of memory cores to be read and the second logical member determining the apparatus to which the counters X and Y are to be set.

What is claimed is:

1. A system for applying scanning pulses to a set of wires corresponding to a set of apparatuses, said set of wires having at least three subsets with each subset including a plurality of wires, comprising means for applying said scanning pulses to the wires of at least two subsets at different frequencies, said means comprising counting means, means for connecting said wires to said counting means whereby scanning pulses are sequentially applied to the wires of each subset, means responsive to the application of a pulse to the last wire of each subset for inhibiting the application of scanning pulses to wires of the respective subset and for initiating the application of scanning pulses to the wires of another subset, said last mentioned means comprising means responsive to the application of a scanning pulse to the last wire of one subset for sequentially initiating the application of scanning pulses to the wires of at least two other subsets, and means responsive to the application of scanning pulses to the last wires of said last mentioned two other subsets for initiating the application of scanning pulses to the wires of said one subset.

2. A system for scanning a set of apparatuses having at least three subsets, each subset including a plurality of apparatuses, comprising means for scanning at least two of said subsets at different frequencies, said means comprising a counting means for each said subset, a source of clock pulses connected to each said counting means, each counting means comprising a separate wire for each apparatus of the respective subset, and a starting terminal, whereby when a starting pulse is applied to the starting terminal of a counting means, the respective counting means sequentially applies a pulse to each wire of the respective subset, means responsive to the application of pulses to the last wire of one subset for sequentially applying pulses to the starting terminals of the counting means of at least two other subsets, and means responsive to the application of a pulse to the last wire of at least two subsets other then said one subset for applying a pulse to the starting terminal of the counting means of said one subset.

3. The system of claim 2 wherein said means responsive to the application of pulses to the last wire of said one subset comprises a plurality of gate circuits for applying pulses from the last wire of said one subset to the starting terminals of the counting means of other subsets, and ring counter means responsive to the application of pulses to a wire of said one subset for sequentially opening said gate circuits.

4. A system for scanning a set of apparatuses having at least three subsets, each subset including a plurality of apparatuses, comprising means for scanning at least two of said subsets at different frequencies, said means comprising a counting means for each said subset, each said counting means including a separate wire for each apparatus of the respective subset, whereby each counting means sequentially applies pulses to the respective wires upon application of pulses to the counting means, the counting means of one subset being a ring counter, means interconnecting counting means of at least two other subsets to form a ring counter, a source of clock pulses, means responsive to the application of a pulse to the last wire of said one subset for inhibiting applications of clock pulses to the respective counting means and for simultaneously applying clock pulses to the counting means of said two other subsets, and means responsive to the application of a pulse to the last wire of any of said two other subsets for inhibiting application of said clock pulses to the counting means of said two other subsets and for applying said clock pulses to said counting means of said one subset.

5. The system of claim 4 in which said counting means each comprise first and second counting circuits, each counting circuit having a plurality of output terminals, a gate circuit connected to each output terminal, and rectifier means for connecting each wire of the respective subset between a gate circuit of said first counting circuit and a gate circuit of said second counting circuit whereby each wire extends between a different pair of gate circuits.

6. A system for applying scanning pulses to a set of wires corresponding to a set of apparatuses, said set of wires having at least three subsets with each subset having a plurality of wires, said system comprising a counting circuit having a plurality of output terminals, a source of clock pulses connected to said counting circuit whereby pulses are sequentially applied to said output terminals, means connecting said wires to said terminals whereby successive pulses are sequentially applied to the wires of each subset, means responsive to the application of a pulse to the last wire of each subset for stopping said counting circuit, said counting circuit comprising means responsive to coded input signals for starting the scanning of said counting circuit at predetermined said terminals, first and second storage means, means responsive to the application of a pulse to the last wire of one subset for storing a first coded signal in said first storage means and for applying code signals stored in said second storage means to said counting circuit, and means responsive to the application of pulses to the last wires of second and third subsets for storing second and third coded signals in said second storage means and for applying said first coded signal stored in said first storage means to said counting means, whereby said first coded signal starts the scanning of said first subset of wires, said second coded signal starts the scanning of said third subset of wires, and said third coded signals start the scanning of a subset of wires other than said third and first subsets.

7. The system of claim 6 comprising a plurality of cores on the last wire of each subset, the cores on the last wire of said first subset being coupled to said first storage means for storing said first coded signal in said first storage means, the cores on the last wires of said second and third subsets being coupled to said second storage means for storing said second and third coded signals respectively therein.

8. The system of claim 7 comprising first and second pulse amplifiers, means for coupling said cores on the last wires of each subset to said first pulse amplifier, said first and second storage means comprising first and second rows of cores, means coupling said first pulse amplifier to said first and second rows of cores to store said coded signals therein by coincidence, means for coupling said first and second rows of cores to said second pulse amplifier, and means for applying the output of said second pulse amplifier to said counting circuit.

9. The system of claim 8 comprising a bistable circuit, an additional core on the last wire of said first subset coupled to set said bistable circuit to a first state, an additional core on the last wires of said second and third subsets coupled to said bistable circuit for setting said bistable circuit to a second state, and means coupling said bistable circuit to said first and second rows of cores for writing in said first row by coincidence and reading said second row in said first state, and for writing in said second row by coincidence and reading said first row in said second state.

10. The system of claim 6 comprising means for interrupting the scanning of said wires, a source of a coded signal corresponding to a predetermined wire, means for applying said last mentioned signal to said counting circuit whereby said predetermined wire is scanned, and means for restarting the scanning of said wires after said predetermined wire is scanned.

11. The system of claim 16 comprising means for scanning a predetermined wire between the scanning times of two successively scanned wires without interrupting the scanning of said two successively scanned wires.

12. A system for applying scanning pulses to a set of wires corresponding to a set of apparatuses, said set of wires having at least three subsets with each subset having a plurality of wires, said system comprising first and second counting circuits each having a plurality of output terminals, means connecting one end of each wire of said first subset to a separate terminal of said first counting circuit, means connecting one end of each wire of said second subset to a separate terminal of said second counting circuit, rectifier means for connecting each wire of said third subset between the other ends of a wire of said first subset and the other end of a wire of said second subset so that a third wire extends between each wire of said first and second subsets, whereby the wires of said first and third subsets are scanned at different frequencies and the wires of said second and third subsets are scanned at different frequencies, and a plurality of storage cores on each wire of said first, second and third subsets.

References Cited by the Examiner

UNITED STATES PATENTS

| | | | |
|---|---|---|---|
| 2,495,739 | 1/1950 | Labin et al. | 179—15 |
| 2,564,419 | 8/1951 | Bown | 179—15 |
| 3,046,346 | 7/1962 | Kramer | 179—15 |
| 3,238,305 | 3/1966 | Bergmann et al. | 179—15 |

DAVID G. REDINBAUGH, *Primary Examiner.*

ROBERT L. GRIFFIN, *Examiner.*